(12) United States Patent
Naitou

(10) Patent No.: US 12,311,558 B2
(45) Date of Patent: May 27, 2025

(54) ROBOT CONTROL DEVICE, ROBOT SYSTEM, AND ROBOT CONTROL METHOD

(71) Applicant: FANUC CORPORATION, Yamanashi (JP)

(72) Inventor: Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 207 days.

(21) Appl. No.: 17/905,825

(22) PCT Filed: Mar. 5, 2021

(86) PCT No.: PCT/JP2021/008814
§ 371 (c)(1),
(2) Date: Sep. 8, 2022

(87) PCT Pub. No.: WO2021/182356
PCT Pub. Date: Sep. 16, 2021

(65) Prior Publication Data
US 2023/0120261 A1  Apr. 20, 2023

(30) Foreign Application Priority Data
Mar. 12, 2020 (JP) .............................. 2020-043420

(51) Int. Cl.
*B25J 9/16* (2006.01)
*B25J 13/08* (2006.01)

(52) U.S. Cl.
CPC ........... *B25J 9/1674* (2013.01); *B25J 13/085* (2013.01)

(58) Field of Classification Search
CPC ............ G05B 2219/40599; G05B 2219/40607
See application file for complete search history.

(56) References Cited

U.S. PATENT DOCUMENTS

| 2015/0177084 | A1* | 6/2015 | Inoue ........................ G01L 5/18 73/862.541 |
| 2020/0023519 | A1* | 1/2020 | Kurze .................... B25J 13/085 |
| 2020/0061817 | A1* | 2/2020 | Takeuchi ............... B25J 13/085 |

(Continued)

FOREIGN PATENT DOCUMENTS

| CN | 102371586 A | 3/2012 |
| JP | 200325272 A | 1/2003 |
| JP | 2005342858 A | 12/2005 |

(Continued)

*Primary Examiner* — Jaime Figueroa
*Assistant Examiner* — Jerrod Irvin Davis
(74) *Attorney, Agent, or Firm* — HAUPTMAN HAM, LLP

(57) ABSTRACT

A control device for a robot includes: an external force acquisition section configured to acquire external force applied to a movable element during operation of the robot; a first condition determination section configured to determine whether or not a first condition that the external force exceeding a predetermined first threshold is applied to the movable element is satisfied; a second condition determination section configured to determine whether or not a second condition that the movable element is moving is satisfied; and an operation control section configured to stop the operation of the robot when both the first condition and the second condition are satisfied, while continuing the operation of the robot when at least one of the first condition and the second condition is not satisfied.

9 Claims, 11 Drawing Sheets

(56) References Cited

U.S. PATENT DOCUMENTS

2020/0130200 A1\* 4/2020 Adachi ................ B25J 13/085

FOREIGN PATENT DOCUMENTS

| JP | 2010228028 A | 10/2010 |
| JP | 2015199174 A | 11/2015 |
| JP | 201664474 A | 4/2016 |
| JP | 2016132080 A | 7/2016 |
| JP | 201777608 A | 4/2017 |
| JP | 202032488 A | 3/2020 |

\* cited by examiner

ROBOT CONTROL DEVICE, ROBOT SYSTEM, AND ROBOT CONTROL METHOD

RELATED APPLICATIONS

The present application is a National Phase of International Application No. PCT/JP2021/008814 filed Mar. 5, 2021, which claims priority to Japanese Application No. 2020-043420, filed Mar. 12, 2020.

TECHNICAL FIELD

The present invention relates to a robot control device, a robot system, and a robot control method.

BACKGROUND ART

A control device has been known that controls a robot to stop operating upon coming into contact with an object in the periphery of the robot (e.g., Patent Document 1)

CITATION LIST

Patent Literature

Patent Document 1: JP 2015-199174 A

SUMMARY OF INVENTION

Technical Problem

There has been a demand for a technique of maintaining work efficiency of a robot, while surely guaranteeing the safety of an object (e.g., a worker) in the periphery of the robot.

Solution to Problem

According to an aspect of the present disclosure, a control device for a robot including a movable element, includes: an external force acquisition section configured to acquire external force applied to the movable element during operation of the robot; a first condition determination section configured to determine whether or not a first condition that the external force exceeding a predetermined first threshold is applied to the movable element is satisfied; a second condition determination section configured to determine whether or not a second condition that the movable element is moving is satisfied; and an operation control section configured to stop the operation of the robot when both the first condition and the second condition are satisfied, while continuing the operation of the robot when at least one of the first condition and the second condition is not satisfied.

According to another aspect of the present disclosure, a control method for a robot including a movable element, includes: acquiring external force applied to the movable element during operation of the robot; determining whether or not a first condition that the external force exceeding a predetermined first threshold is applied to the movable element is satisfied; determining whether or not a second condition that the movable element is moving is satisfied; and stopping the operation of the robot when both the first condition and the second condition are satisfied, while continuing the operation of the robot when at least one of the first condition and the second condition is not satisfied.

Effects of Invention

According to the present disclosure, when the first condition and the second condition are both satisfied, the operation of the robot is stopped, to surely guarantee the safety at work. On the other hand, when at least one of the first condition and the second condition is not satisfied, the operation of the robot continues, so that the efficiency at work can be prevented from being compromised.

DESCRIPTION OF EMBODIMENTS

Figure 1:
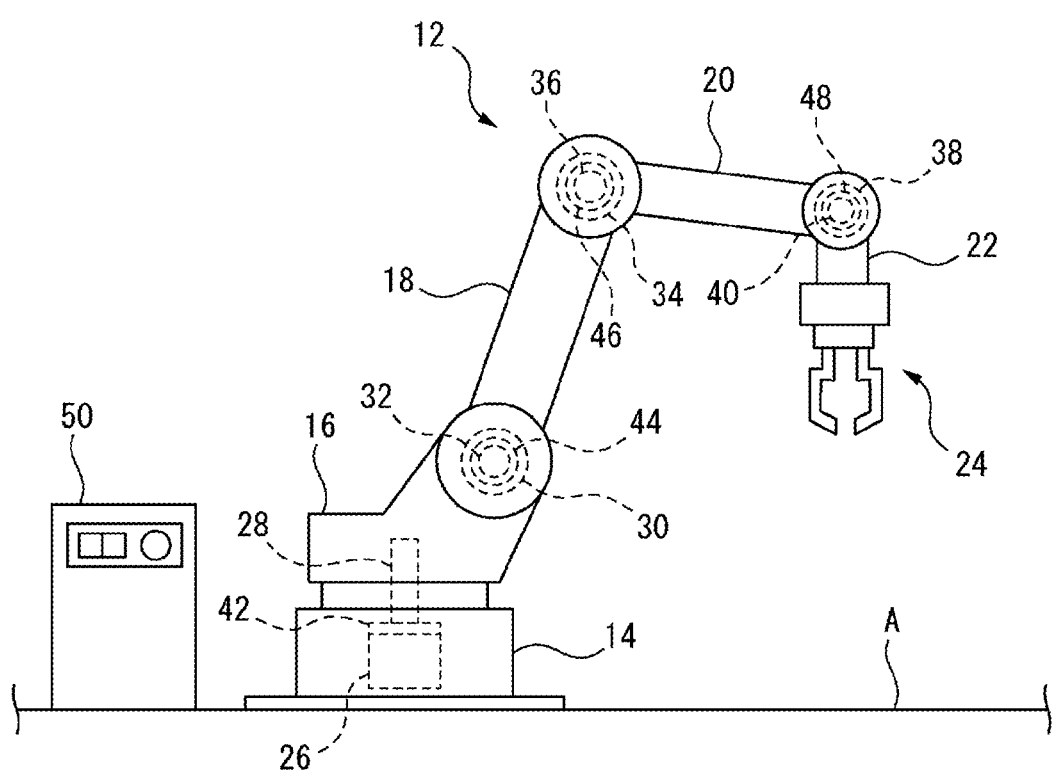
FIG. 1 is a diagram of a robot system according to an embodiment.
Figure 2:
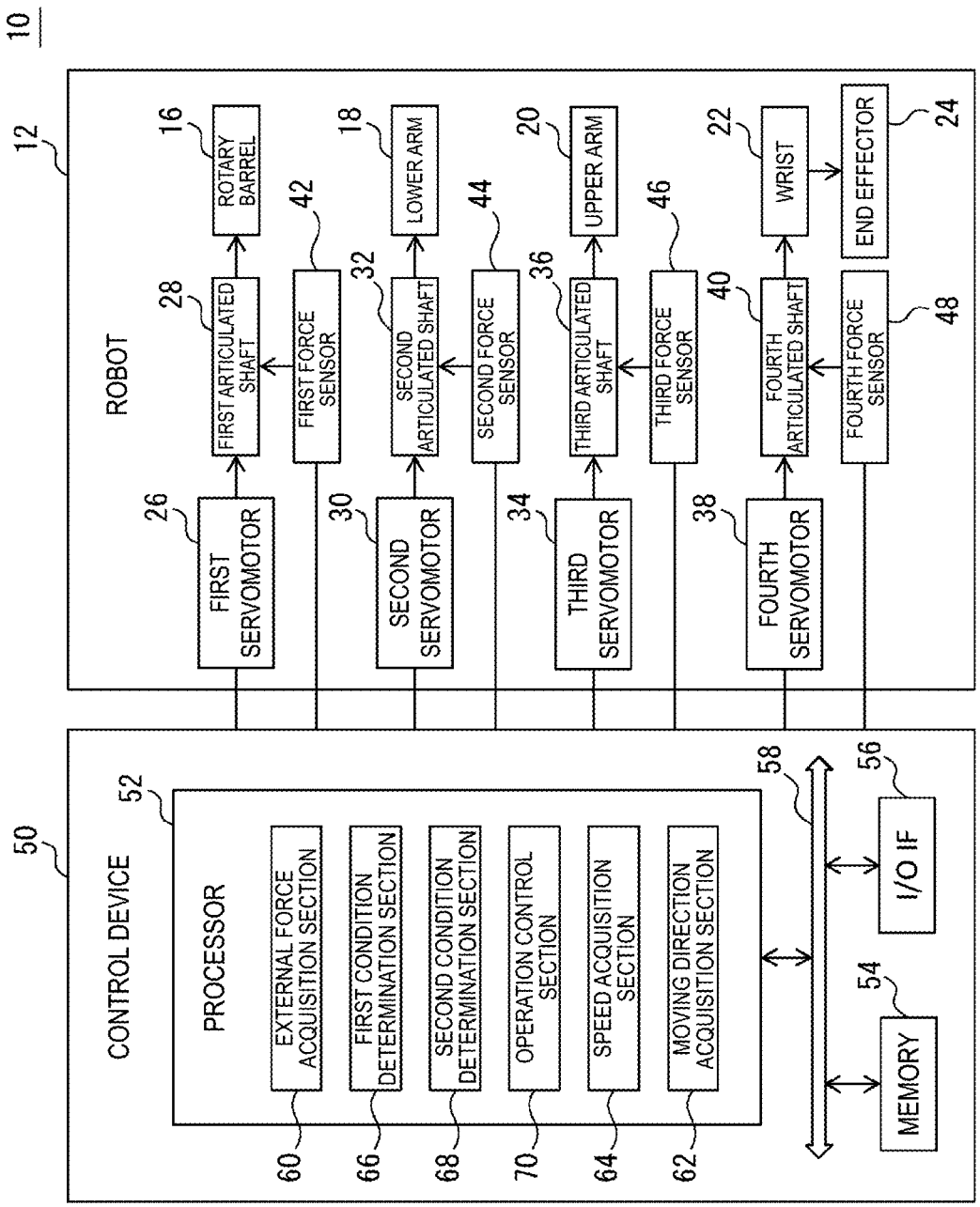
FIG. 2 is a block diagram of the robot system illustrated in FIG. 1.

Hereinafter, embodiments of the present disclosure will be described in detail with reference to the drawings. Note that in various embodiments described below, the same elements are denoted by the same reference signs, and redundant description will be omitted. First, a robot system 10 according to an embodiment will be described with reference to FIG. 1 and FIG. 2. The robot system 10 includes a robot 12 and a control device 50 that controls the robot 12.

In the present embodiment, the robot 12 is a vertical articulated robot and includes a robot base 14, a rotary barrel 16, a lower arm 18, an upper arm 20, a wrist 22, and an end effector 24. The robot base 14 is fixed on a floor A of a work cell. The rotary barrel 16 is mounted on the robot base 14 to be rotatable about a vertical axis. The lower arm 18 is provided on the rotary barrel 16 to be rotatable about a horizontal axis. The upper arm 20 is rotatably provided at the tip of the lower arm 18.

The wrist 22 is rotatably provided at the tip of the upper arm 20, and the end effector 24 is detachably attached to the tip of the wrist 22. The wrist 22 may be configured to rotate the end effector 24 about a plurality of axes orthogonal to each other. The end effector 24 is a robot hand, a welding torch, a cutting tool, a laser machining head, a coating material applicator, or the like for example, and performs predetermined work (work-handling, welding, cutting, laser machining, coating, or the like) on a workpiece (not illustrated).

The robot 12 further includes a first servomotor 26, a first articulated shaft 28, a second servomotor 30, a second articulated shaft 32, a third servomotor 34, a third articulated shaft 36, a fourth servomotor 38, and a fourth articulated shaft 40. The first servomotor 26 is incorporated in the robot base 14 and rotates the first articulated shaft 28 about the vertical axis. The first articulated shaft 28 is coupled to the rotary barrel 16 to transmit the rotational force from the first servomotor 26 to the rotary barrel 16.

The second servomotor 30 is provided in the rotary barrel 16 and rotates the second articulated shaft 32 about the horizontal axis. The second articulated shaft 32 is coupled to the lower arm 18 and transmits the rotational force from the second servomotor 30 to the lower arm 18. The third servomotor 34 is provided to the lower arm 18 and rotates the third articulated shaft 36. The third articulated shaft 36 is coupled to the upper arm 20 and transmits the rotational force from the third servomotor 34 to the upper arm 20. The fourth servomotor 38 is provided to the upper arm 20 and rotates the fourth articulated shaft 40. The fourth articulated shaft 40 is coupled to the wrist 22, and transmits the rotational force from the fourth servomotor 38 to the wrist 22.

These plurality of servomotors 26, 30, 34, and 38 respectively rotate the articulated shafts 28, 32, 36, and 40 under a command from the control device 50, to thus respectively rotate the rotary barrel 16, the lower arm 18, the upper arm 20, as well as the wrist 22 and the end effector 24. Thus, the articulated shafts 28, 32, 36, and 40, the rotary barrel 16, the lower arm 18, the upper arm 20, the wrist 22, and the end effector 24 serve as movable elements of the robot 12.

In the present embodiment, the articulated shafts 28, 32, 36, and 40 are respectively provided with a plurality of force sensors 42, 44, 46, and 48. Each of the force sensors 42, 44, 46, and 48 is a torque sensor. Specifically, the first force sensor 42 detects the force (specifically, torque) applied to the first articulated shaft 28 and the second force sensor 44 detects the force (specifically, torque) applied to the second articulated shaft 32.

The third force sensor 46 detects the force (specifically, torque) applied to the third articulated shaft 36 and the fourth force sensor 48 detects the force (specifically, torque) applied to the fourth articulated shaft 40. The first force sensor 42, the second force sensor 44, the third force sensor 46, and the fourth force sensor 48 each transmit detection data on the force (torque) detected, to the control device 50.

The control device 50 is a computer including a the processor 52, a memory 54, and an I/O interface 56. The processor 52 includes a CPU, a GPU, or the like, and is communicably connected to the memory 54 and the I/O interface 56 via a bus 58. The processor 52 performs calculations for implementing various functions of the control device 50 described below while communicating with the memory 54 and the I/O interface 56.

The memory 54 includes a RAM, a ROM, or the like, and stores various types of data temporarily or permanently. The memory 54 pre-stores a work program WP for causing the robot 12 to execute a predetermined work. The work program WP is a computer program including position data on a teaching point at which the end effector 24 is to be positioned for work, an instruction for positioning the end effector 24 at the teaching point, and information on the movement trajectory and the moving speed between the two teaching points. This work program WP can be constructed, for example, by teaching the robot 12 operation of sequentially positioning the end effector 24 at the teaching points.

The I/O interface 56 has, for example, an Ethernet (registered trademark) port, a USB port, a fiber optic connector, a HDMI (registered trademark) terminal, or the like and exchanges data with an external device through wireless or wired communications under a command from the processor 52. In the present embodiment, the servomotors 26, 30, 34, and 38 and the force sensors 42, 44, 46, and 48 are communicatively connected to the I/O interface 56.

The processor 52 transmits a command to the servomotors 26, 30, 34, and 38 via the I/O interface 56 based on the work program WP stored in the memory 54, to operate the robot 12 (specifically, the movable elements) to make the robot 12 execute a predetermined work. The processor 52 acquires the detection data, detected by the force sensors 42, 44, 46, and 48, via the I/O interface 56 while the robot 12 is operating, and stores the detection data in the memory 54.

Next, an example of a flow of robot control executed by the control device 50 will be described with reference to FIG. 3. A flow illustrated in FIG. 3 starts when the processor 52 receives an automatic work start command from an operator, a host controller, or a computer program (e.g., the work program WP described above).

In step S1, the processor 52 starts operation of the robot 12. Specifically, the processor 52 starts a series of operations of transmitting a command to each of the servomotors 26, 30, 34, and 38 based on the work program WP, making the movable elements of the robot 12 move the end effector 24 to each teaching point, and performing a work on a workpiece with the end effector 24.

In step S2, the processor 52 starts acquiring external force applied to the movable element of the robot 12. Specifically, the processor 52 acquires the detection data sequentially (e.g., periodically) from the first force sensor 42, the second force sensor 44, the third force sensor 46, and the fourth force sensor 48.

On the other hand, each time the detection data is acquired, the processor 52 calculates force (referred to as "internal force" in this document) applied to each of the first force sensor 42, the second force sensor 44, the third force sensor 46, and the fourth force sensor 48, based on the mass of the robot 12 and inertial force produced by the operation of the robot 12. The internal force can be calculated by substituting the mass of each movable element of the robot 12, the orientation of the robot 12, and the moving speed of each movable element of the robot 12 into a known kinetic dynamic equation.

Then, the processor 52 subtracts a component of the internal force applied to the first force sensor 42 from the detection data (i.e., the torque applied to the first articulated shaft 28) detected by the first force sensor 42, to calculate external torque $ET_1$ applied to the first articulated shaft 28. Similarly, the processor 52 subtracts the corresponding component of the internal force from the detection data (i.e., the torque applied to the second articulated shaft 32, the third articulated shaft 36, and the fourth articulated shaft 40) detected by each of the second force sensor 44, the third force sensor 46, and the fourth force sensor 48, to calculate each of external torque $ET_2$, $ET_3$, and $ET_4$ applied to the second articulated shaft 32, the third articulated shaft 36, and the fourth articulated shaft 40.

In this manner, the processor 52 acquires external torque $ET_n$ (n=1, 2, 3, 4), based on the detection data of the force sensor 42, 44, 46, 48. Thus, in the present embodiment, the processor 52 functions as an external force acquisition section 60 (FIG. 2) that acquires the external force (external torque) $ET_n$ applied to the movable element (the articulated shaft 28, 32, 36, 40) while the robot 12 is operating.

In step S3, the processor 52 starts acquiring movement information on the movable elements of the robot 12. Specifically, the processor 52 acquires, as the movement information, a moving direction $MD_1$ and a moving speed $MV_1$ of the first articulated shaft 28, a moving direction $MD_2$ and a moving speed $MV_2$ of the second articulated shaft 32, a moving direction $MD_3$ and a moving speed $MV_3$ of the third articulated shaft 36, as well as a moving direction $MD_4$ and a moving speed $MV_4$ of the fourth articulated shaft 40.

For example, the servomotors 26, 30, 34, and 38 (or the articulated shafts 28, 32, 36, and 40) are each provided with a rotation detector (such as an encoder or a hall effect sensor). The rotation detectors detect the rotational positions (or rotational angles) of the respective servomotors 26, 30, 34, and 38 (or the articulated shafts 28, 32, 36, and 40), and transmit them as a position feedback FB to the control device 50. Based on the position feedback FB from the rotation detectors, the processor 52 can acquire a moving direction $MD_n$ and a moving speed $MV_n$ (n=1, 2, 3, 4).

As another example, the processor 52 may acquire the moving direction $MD_n$ and the moving speed $MV_n$, based on a command (such as a position command and a speed command) transmitted to the servomotors 26, 30, 34, and 38. As still another example, the processor 52 may analyze the work program WP, and acquire the moving direction $MD_n$ and the moving speed $MV_n$, from information, included in the work program WP, such as the position data on the teaching point, the instruction, the movement trajectory, or the moving speed. As described above, in the present embodiment, the processor 52 functions as a moving direction acquisition section 62 (FIG. 2) that acquires the moving direction $MD_n$ of the movable element (articulated shaft 28, 32, 36, 40), and a speed acquisition section 64 that acquires the moving speed $MV_n$ of the movable element.

Note that in the present embodiment, the moving direction $MD_n$ indicates the rotation direction of the nth articulated shaft 28, 32, 36, 40. The moving speed $MV_n$ indicates the rotation speed (rotational frequency) of the nth articulated shaft 28, 32, 36, 40. After the start of this step S3, the processor 52 may, in synchronization with (specifically, at the same timing as) the acquisition of the external torque $ET_n$ in step S2 described above, acquire the movement information (the moving direction $MD_n$ and the moving speed $MV_n$).

In step S4, the processor 52 sets "n", which is the number identifying the nth articulated shaft 28, 32, 36, 40, to "1". In step S5, the processor 52 determines whether or not a first condition that the external torque $ET_n$ exceeding a predetermined threshold $\alpha_n$ (first threshold) is applied to the nth articulated shaft 28, 32, 36, or 40 is satisfied.

Here, in the present embodiment, the processor 52 determines that the first condition is satisfied, when the external torque $ET_n$ in a direction opposite to the moving direction $MD_n$ of the nth articulated shaft 28, 32, 36, or 40 exceeds the threshold $\alpha_n$. A description below is given assuming a case where n is set to 3 at the start of this step S4.

In this case, the processor 52 determines whether or not the direction of the most recently acquired external torque $ET_3$ applied to the third articulated shaft 36 is opposite to the moving direction $MD_3$ of the third articulated shaft 36 acquired in synchronization with the external torque $ET_3$, and whether or not the magnitude of the external torque $ET_3$ exceeds a threshold $\alpha_3$. The processor 52 determines that the first condition is satisfied for the third articulated shaft 36 (i.e., YES) and proceeds to step S6, when the direction of the external torque $ET_3$ is opposite to the moving direction $MD_3$, and the magnitude of the torque exceeds the threshold $\alpha_3$.

On the other hand, when the magnitude of the external torque $ET_3$ is smaller the threshold $\alpha_3$, or when the external torque $ET_3$ is applied in the moving direction $MD_3$, the processor 52 determines that the first condition is not satisfied for the third articulated shaft 36 (i.e., NO), and proceeds to step S7. As described above, in the present embodiment, the processor 52 functions as a first condition determination section 66 (FIG. 2) that determines whether or not the first condition that the external force $ET_n$ exceeding the threshold $\alpha_n$ is applied to the movable element (the nth articulated shaft 28, 32, 36, or 40) is satisfied.

In step S6, the processor 52 determines whether or not a second condition that the nth articulated shaft 28, 32, 36, or 40 is moving is satisfied. Specifically, the processor 52 determines that the second condition is satisfied, when the moving speed $MV_n$ of the nth articulated shaft 28, 32, 36, or 40, acquired in synchronization with the external torque $ET_n$ with which the determination on the first condition has been made in the most recent step S5, exceeds a predetermined threshold $\beta_n$ (second threshold).

If n is set to 3 at the start of this step S6, the processor 52 determines that the second condition is satisfied for the third articulated shaft 36 (i.e., YES), when the moving speed $MV_3$ of the third articulated shaft 36, acquired in synchronization with the external torque $ET_3$ with which the determination on the first condition has been made the in most recent step S5, exceeds the threshold $\beta_3$. Upon determining YES, the processor 52 proceeds to step S10.

On the other hand, when the moving speed $MV_3$ is smaller than the threshold $\beta_3$, the processor 52 determines that the second condition is not satisfied for the third articulated shaft 36 (i.e., NO), and proceeds to step S7. As described above, in the present embodiment, the processor 52 functions as a second condition determination section 68 (FIG. 2) that determines whether or not the second condition that the movable element (the nth articulated shaft 28, 32, 36, or 40) is moving is satisfied.

Note that, in this step S6, the processor 52 may determine that the second condition is satisfied when acceleration $a_n$ of the nth articulated shaft 28, 32, 36, or 40 exceeds a predetermined threshold $\gamma_n$. This acceleration $a_n$ is, for example, obtained through time differentiation on the moving speed $MV_n$ acquired in synchronization with the external torque $ET_n$ with which the determination on the first condition is made in the most recent step S5 for example.

In step S7, the processor 52 increments the number "n" identifying the nth articulated shaft 28, 32, 36, 40 by "1" (n=n+1). In step S8, the processor 52 determines whether or not the number "n" identifying the nth articulated shaft 28, 32, 36, 40 is equal to or larger than "5". This number "5" is the number as a result of adding 1 to the total number of the articulated shafts 28, 32, 36, and 40 of the robot 12.

The processor 52 determines YES and proceeds to step S9 when n=5 holds, and determines NO and returns to step S5 when n≤4 holds. Thus, the processor 52 loops step S5 to step S8, until determining YES in step S6 or step S8, to determine whether or not the first condition and the second condition are satisfied for each of the articulated shafts 28, 32, 36, and 40 one by one.

In step S9, the processor 52 determines whether or not the series of operations of the robot 12 have ended. For example, the processor 52 can determine whether or not the operation of the robot 12 has ended, based on the work program WP and the information on the position feedback FB. Upon determining that the operation of the robot 12 has ended (i.e., YES), the processor 52 stops the robot 12, and ends the flow illustrated in FIG. 3. On the other hand, when the processor 52 determines that the operation of the robot 12 has not ended yet (i.e., NO), the processing returns to step S4. The processing loops between step S4 to S9, until the processor 52 determines YES in step S6 or S9.

On the other hand, upon determining YES in step S6, the processor 52 stops the operation of the robot 12 in step S10. For example, the processor 52 transmits stop commands to all of the servomotors 26, 30, 34, and 38, to stop the operation of these servomotors 26, 30, 34, and 38 at once, and thus makes the robot 12 stop the operation.

As another example, the servomotors 26, 30, 34, and 38 are provided with respective brake mechanisms to provide braking for output shafts (or the articulated shafts 28, 32, 36, and 40) of the servomotors 26, 30, 34, and 38. The processor 52 may activate these brake mechanisms to stop the rotational operation of the output shafts (or the articulated shafts 28, 32, 36, and 40) of the servomotors 26, 30, 34, and 38, and thus cause the emergency stop of the robot 12.

In step S11, the processor 52 causes the robot 12 to execute a retracting operation. For example, the processor 52 may make the robot 12 retract, by rotating the nth articulated shafts 28, 32, 36, and 40 in a direction $MD_n'$ opposite to the most recently acquired moving direction $MD_n$ (i.e., reverse rotation of the nth articulated shaft).

Alternatively, the processor 52 may make the robot 12 retract, by identifying a position at which external force is applied to the robot 12 and a direction of the external force, based on the most recently acquired external torque $ET_1$, $ET_2$, $ET_3$, and $ET_4$, and moving the movable element corresponding the position (e.g., the lower arm 18, the upper arm 20, the wrist 22, the end effector 24) in a direction opposite to the direction of the external force.

As described above, the processor 52 stops the operation of the robot 12 in step S10 when both of the first condition and the second condition are satisfied (i.e., the result of the determination in step S5 and step S6 is YES) for one articulated shaft 28, 32, 36, or 40, and make the robot 12 continue the operation until YES is determined in step S9, when at least of one of the first condition and the second condition is not satisfied. Thus, the processor 52 functions as an operation control section 70 (FIG. 2) that controls the operation of the robot 12.

Thus, in the present embodiment, the robot 12 continues to operate instead of stopping, unless an excessive external force is applied to the movable element (articulated shaft 28, 32, 36, 40) moving. When an object in the periphery (such as an obstacle or a worker) unexpectedly collides with the moving movable element (the rotary barrel 16, the lower arm 18, the upper arm 20, the wrist 22, the end effector 24) during the operation of the robot 12, huge impact force might be applied to the object. In such a case, external force applied from the object to the robot 12, is strongly applied to the moving movable element.

On the other hand, in a case where the robot 12 is operating while one of the movable elements (e.g., the upper arm 20) is moving whereas another movable element (e.g., the rotary barrel 16) is not moving, even when external force is applied to the movable element that is not moving, safety may be guaranteed since the unmoving movable element would not further collide with an object in the periphery.

According to the present embodiment, when the first condition and the second condition are both satisfied, huge force is likely to be applied to an object in the periphery, and thus the operation of the robot 12 is stopped, surely guaranteeing the safety at work. On the other hand, when at least one of the first condition and the second condition is not satisfied, the operation of the robot 12 continues, so that the efficiency at work can be prevented from being compromised.

This advantageous effect is described in further detail in an example of the present embodiment where the processor 52 is rotating the first articulated shaft 28 without moving the second articulated shaft 32, the third articulated shaft 36, and the fourth articulated shaft 40, during the operation of the robot 12 started in step S1. In this case, the rotary barrel 16, the lower arm 18, the upper arm 20, the wrist 22, and the end effector 24 positioned on the tip side of the first articulated shaft 28 rotate about the first articulated shaft 28.

Under this condition, when the rotating movable element (the rotary barrel 16, the lower arm 18, the upper arm 20, the wrist 22, or the end effector 24) unexpectedly collides with an object in the periphery (such as an obstacle or a worker) and the external torque $ET_1$ applied to the first articulated shaft 28 exceeds the threshold $\alpha_1$, the processor 52 determines YES in step S5 and step S6, and stops the operation of the robot 12 in step S10.

On the other hand, when the external torque $ET_1$ applied to the first articulated shaft 28 does not exceed the threshold $\alpha_1$ but the external torque $ET_2$, $ET_3$, or $ET_4$ applied to the second articulated shaft 32, the third articulated shaft 36, or the fourth articulated shaft 40 exceeds the threshold $\alpha_2$, $\alpha_3$, or $\alpha_4$, the processor 52 determines NO in step S6 because the second articulated shaft 32, the third articulated shaft 36, or the fourth articulated shaft 40 is not rotating, and thus continues the operation of the robot 12.

The collision of the movable element (the rotary barrel 16, the lower arm 18, the upper arm 20, the wrist 22, or the end effector 24) with an object in the periphery while the first articulated shaft 28 is rotating inevitably results in the external torque $ET_1$ applied to the first articulated shaft 28 being huge. Thus, when the external torque $ET_1$ does not exceed the threshold $\alpha_1$, even if the external torque $ET_2$, $ET_3$, or the $ET_4$ exceeds the threshold $\alpha_2$, $\alpha_3$, or $\alpha_4$ in this case, the external torque $ET_2$, $ET_3$, or $ET_4$ can be regarded as not being produced by the operation of the robot 12 (i.e., the rotation of the first articulated shaft 28), and thus it can be anticipated that a huge force is less likely to be applied to the object in the periphery. In this manner, the operation of the robot 12 can continue if at least one of the first condition and the second condition is not satisfied, whereby the efficiency at work can be prevented from being compromised.

In the present embodiment, the processor 52 determines that the first condition is satisfied when the external torque $ET_n$ in the direction $MD_n'$ opposite to the moving direction $MD_n$ exceeds the threshold $\alpha_n$. When the moving movable element unexpectedly collides with an object in the periphery, external force applied to the movable element from object, is strongly applied in the opposite direction $MD_n'$ as a reaction to the collision.

On the other hand, for example, in a case where the robot 12 cooperates with the worker, when the operator intentionally applies external force to the predetermined movable element (e.g., the end effector 24) of the robot 12 to move the movable element, the direction the external force substantially matches the moving direction of the movable element.

According to the present embodiment, the determination on the first condition is made based on the external torque $ET_n$ in the opposite direction $MD_n'$. Thus, the robot 12 can be stopped if the moving movable element is likely to have unexpectedly collided with an object in the periphery. On the other hand, the robot 12 can continue operating when the worker is intentionally applying external force to the robot 12 for the cooperative work as described above. Thus, efficiency of the cooperative work or the like can be prevented from being compromised, while surely guaranteeing the safety at work.

In the present embodiment, the robot 12 executes the retracting operation after being stopped (step S11). With this configuration, safety of the object in the periphery can be more effectively guaranteed. Still, step S11 may be omitted, and the processor 52 may simply stop the robot 12 in step S10.

In step S5 described above, the processor 52 may determine that the first condition is satisfied (i.e., YES), when the magnitude of the external torque $ET_n$ exceeds the threshold $\alpha_n$ regardless of the direction thereof, that is, without determining whether or not the direction of the external torque $ET_n$ is opposite to the moving direction $MD_n$. In this case, the processor 52 needs not to acquire the moving direction $MD_n$ in step S3 described above. Thus, the moving direction acquisition section 62 can be omitted from the control device 50.

In step S6 described above, the processor 52 may determine whether or not the second condition is satisfied, without comparing the moving speed $MV_n$ with the threshold $\beta_n$. For example, the processor 52 may determine that the nth articulated shaft 28, 32, 36, or 40 is moving (i.e., the second condition is satisfied) when a value of the position feedback FB from the rotation detector described above varies.

Alternatively, the processor 52 may determine whether or not the nth articulated shaft 28, 32, 36, or 40 is moving, based on the command to the nth servomotor 26, 30, 34, or 38, the instruction included in the work program WP, or the like. In this case, the processor 52 needs not to acquire the moving speed $MV_n$ in step S3 described above. Thus, the speed acquisition section 64 can be omitted from the control device 50.

Figure 3:
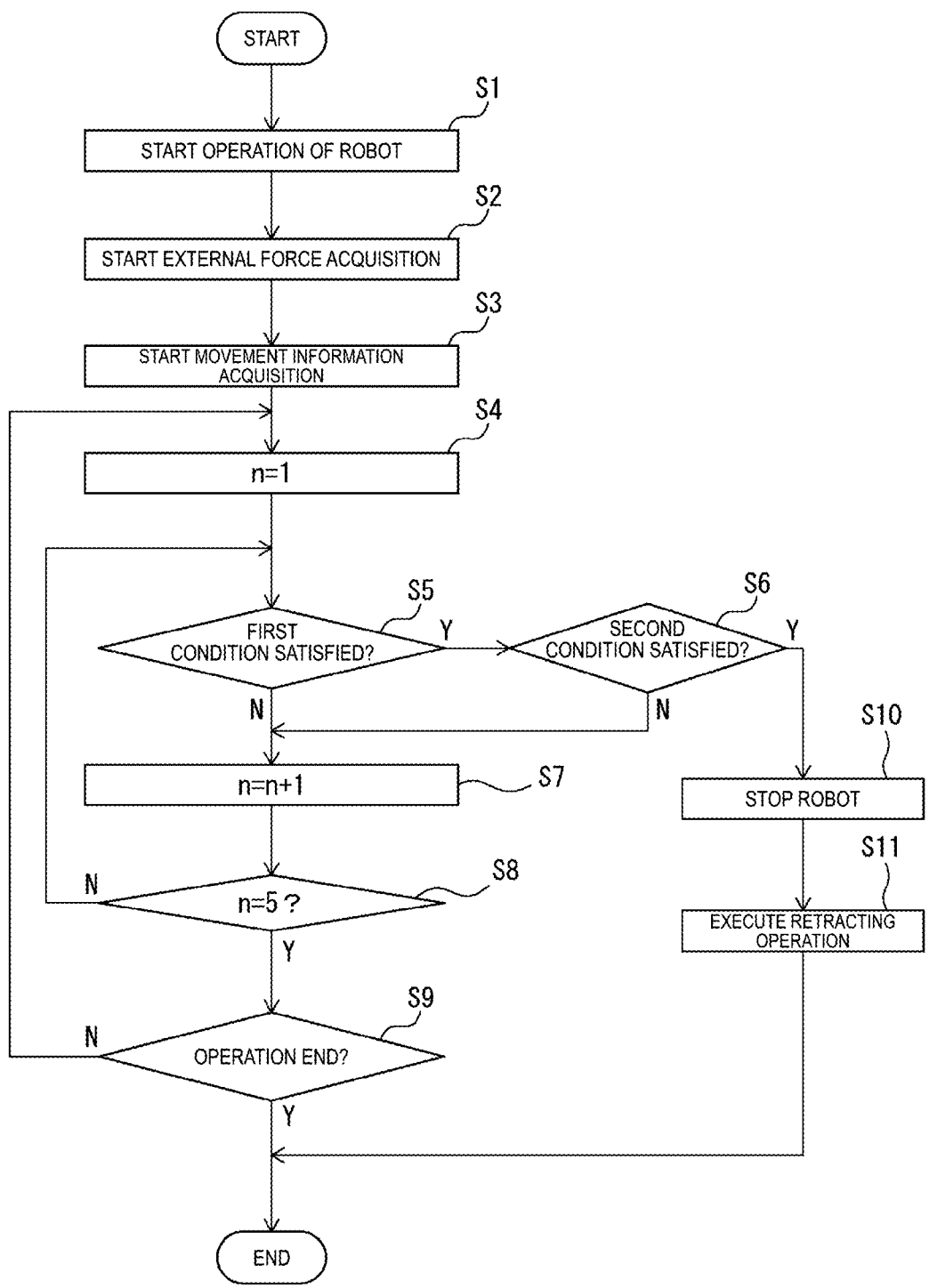
FIG. 3 is a flowchart illustrating an example of a robot control method.

Furthermore, the order of the processes in the flow illustrated in FIG. 3 can be changed. For example, the processor 52 may execute step S6 to determine whether or not the second condition is satisfied after step S4, and upon determining that the second condition is satisfied (YES), execute step S5 to determine whether or not the first condition is satisfied, and proceed to step S10 when the result of this determination is YES. Thus, in this case, the processor 52 determines whether or not the first condition is satisfied (i.e., whether or not the external torque $ET_n$ exceeds the threshold $\alpha_n$) for the movable element (the nth articulated shaft) determined to be moving.

As another example, the processor 52 may execute step S4 after step S1 and execute step S6 to determine whether or not the second condition is satisfied after step S4. Then, upon determining that the second condition is satisfied (YES), the processor 52 may execute step S2 to acquire the external torque $ET_n$ applied to the nth articulated shaft 28, 32, 36, or 40, and then execute step S3 to acquire the movement information on the nth articulated shaft 28, 32, 36, or 40.

Then, after step S3, step S5 may be executed where whether or not the first condition is satisfied is determined, and the processing may proceed to step S10, when the result of this determination is YES. Thus, in this case, the processor 52 executes, for the movable element (the nth articulated shaft) determined to be moving, a series of schemes including acquisition of the external torque $ET_n$, acquisition of the movement information, and determination on the first condition.

Next, another example of a flow of robot control executed by the control device 50 will be described with reference to FIG. 4. Note that in a flow illustrated in FIG. 4, processing similar to that of the process illustrated in FIG. 3 will be denoted by the same step number and redundant description thereof will be omitted. The flow illustrated in FIG. 4 starts when the processor 52 receives the above-mentioned automatic work start command After step S1, in step S21, the processor 52 functions as the external force acquisition section 60, and acquires external force EF applied to the movable element of the robot 12. Specifically, the processor 52 acquires the detection data from the first force sensor 42, the second force sensor 44, the third force sensor 46, and the fourth force sensor 48, and subtracts the corresponding internal force component from each detection data, to calculate each of the external torques $ET_1$, $ET_2$, $ET_3$, and $ET_4$.

Then, the processor 52 acquires the external force EF applied to the robot 12, based on the external torques $ET_1$, $ET_2$, $ET_3$, and $ET_4$. The external force EF applied to a predetermined section (e.g., the end effector 24) of the robot 12 is applied to all the articulated shafts 28, 32, 36, and 40 positioned on the base end side of the predetermined section.

The external torque ET applied to the articulated shaft s28, 32, 36, 40 when the external force EF of a predetermined magnitude and direction is applied to the predetermined section of the robot 12 can be known from kinetic equations, experimental methods, simulations, or the like. In other words, the section of the robot 12 to which the external force EF is applied as well as the magnitude and the direction of the external force EF can be estimated from the external torque applied to the articulated shaft s 28, 32, 36, 40.

Based on the external torques $ET_1$, $ET_2$, $ET_3$, and $ET_4$ calculated, the processor 52 identifies which of the movable elements of the robot 12 (the rotary barrel 16, the lower arm 18, the upper arm 20, the wrist 22, or the end effector 24) has received the external force EF, and acquires the magnitude and the direction of the external force EF.

In step S22, the processor 52 acquires movement information on the movable element identified as the one that has received the external force EF in the most recent step S21. If the upper arm 20 of the robot 12 is assumed to be identified as the section to which the external force EF has been applied in the most recent step S21, the processor 52 functions as the speed acquisition section 64 described above, and acquires a moving speed $MV_U$ (or the acceleration) of the upper arm 20 as the movement information.

This moving speed $MV_U$ may be the moving speed $MV_U$ of the upper arm 20 in a robot coordinate system (or the world coordinate system defining the three dimensional space of the work cell) set to the robot 12 for controlling the robot 12, or may be the moving speed (i.e., the rotation speed) $MV_U$ of the upper arm 20 relative to the lower arm 18 coupled to the base end side of the upper arm 20.

For example, the processor 52 can acquire the moving speed $MV_U$ based on the position feedback FB from the rotation detectors for the servomotors 26, 30, and 34 disposed on the base end side of the upper arm 20, a command to the servomotors 26, 30, and 34, or information included in the work program WP (such as instruction). The processor 52 functions as the moving direction acquisition section 62 described above, and acquires a moving direction $MD_U$ of the upper arm 20 based on the position feedback FB, the command, or the work program WP. This moving speed $MD_U$ may be the moving direction $MD_U$ of the upper arm 20 in the robot coordinate system (or the world coordinate system) described above, or may be the moving direction (i.e., the rotation direction) $MD_U$ of the upper arm 20 relative to the lower arm 18 coupled to the base end side of the upper arm 20.

In step S23, the processor 52 functions as the first condition determination section 66, and determines whether or not the first condition that the external force FT exceeding a predetermined threshold δ (first threshold) is applied to the movable element is satisfied. For example, different thresholds $δ_1$, $δ_2$, $δ_3$, $δ_4$, and $δ_5$ for the external force EF are respectively set for the rotary barrel 16, the lower arm 18, the upper arm 20, the wrist 22, and the end effector 24 that are the movable elements.

In the following, a case is described where the upper arm 20 of the robot 12 is identified as the section to which the external force EF has been applied in the most recent step S21. In this case, the processor 52 determines that the first condition is satisfied (i.e., YES), when external force $EF_U$ in a direction $MD_U'$ opposite to the moving direction $MD_U$ of the upper arm 20 exceeds the threshold $δ_3$.

Specifically, the processor 52 determines whether or not the direction of the external force $EF_U$ acquired in the most recent step S21 is opposite to the moving direction $MD_U$ of the upper arm 20 acquired in the most recent step S22 and whether or not the magnitude of the external force $EF_U$ exceeds the threshold $δ_3$. The processor 52 determines that the first condition is satisfied (i.e., YES), when the direction of the external force $EF_U$ is opposite to the moving direction $MD_U$ and the magnitude thereof exceeds the threshold $δ_3$.

In this case, the processor 52 may determine that the direction of the external torque $ET_n$ is opposite to the moving direction $MD_n$, when an angle θ between the direction of the external force $EF_U$ and the moving direction $MD_U$ is within a predetermined range (e.g., a range of θ>90°). Alternatively, the processor 52 may determine that the direction of the external torque $ET_n$ is opposite to the moving direction $MD_n$, when an inner product IP between an unit vector of the external force $EF_U$ and a unit vector of the moving direction $MD_U$ is within a predetermined range (e.g., a range of IP<0).

Alternatively, the processor 52 may obtain a component $EF_U'$, of the external force $EF_U$ acquired, in a direction opposite to the moving direction $MD_U$, determine whether or not the component $EF_U'$ exceeds the threshold $δ_3$, and determine YES if the component $EF_U'$ exceeds the threshold $δ_3$. The processor 52 proceeds to step S24 upon determining YES in this step S23, and proceeds to step S9 upon determining NO.

In step S23, the processor 52 may determine that the first condition is satisfied (YES) when the magnitude of the external force EF acquired exceeds the threshold δ, without taking the direction of the external force EF applied to the movable element into consideration. Instead of setting the thresholds $δ_1$, $δ_2$, $δ_3$, $δ_4$, and $δ_5$ respectively for the plurality of movable elements, a uniform threshold $δ_0$ may be set for all of the movable elements.

In step S24, the processor 52 functions as the second condition determination section 68, and determines whether or not the second condition that the movable element to which the external force EF is applied is moving is satisfied. In a case where the upper arm 20 is assumed to be identified as the section to which the external force EF is applied in the most recent step S21, the processor 52 determines that the second condition is satisfied (i.e., YES), when the moving speed $MV_U$ (or the acceleration) of the upper arm 20 acquired in the most recent step S22 exceeds a predetermined threshold ε (second threshold).

The processor 52 can also determine whether or not the second condition is satisfied without comparing the moving speed $MV_U$ with the threshold ε. For example, the processor 52 may determine that the upper arm 20 is moving (i.e., the second condition is satisfied) when a value of the position feedback FB from the rotation detector provided to the third servomotor 34 varies.

Alternatively, the processor 52 may determine whether or not the upper arm 20 is moving based on the command to the third servomotor 34, the instruction included in the work program WP, or the like. The processor 52 proceeds to step S10, where the operation of the robot 12 is stopped, upon determining YES in this step S24, and proceeds to step S9 upon determining NO. In this manner, the processing loops between step S21 to S24 and step S9, until the processor 52 determines YES in step S9 or S24.

As described above, in the present embodiment, the processor 52 acquires the external force EF applied to the rotary barrel 16, the lower arm 18, the upper arm 20, the wrist 22, or the end effector 24 that are the movable elements, and stops the robot 12 in step S10, when the first condition that the external force EF exceeding the threshold δ is applied to the movable element, and the second condition that the movable element is moving are both satisfied.

On the other hand, when at least one of the first condition and the second condition is not satisfied, the processor 52 makes the robot 12 continue the operation until YES is determined in step S9. With this configuration, as in the embodiment described above, the efficiency at work can be prevented from being compromised, while surely guaranteeing the safety at work.

Figure 5:
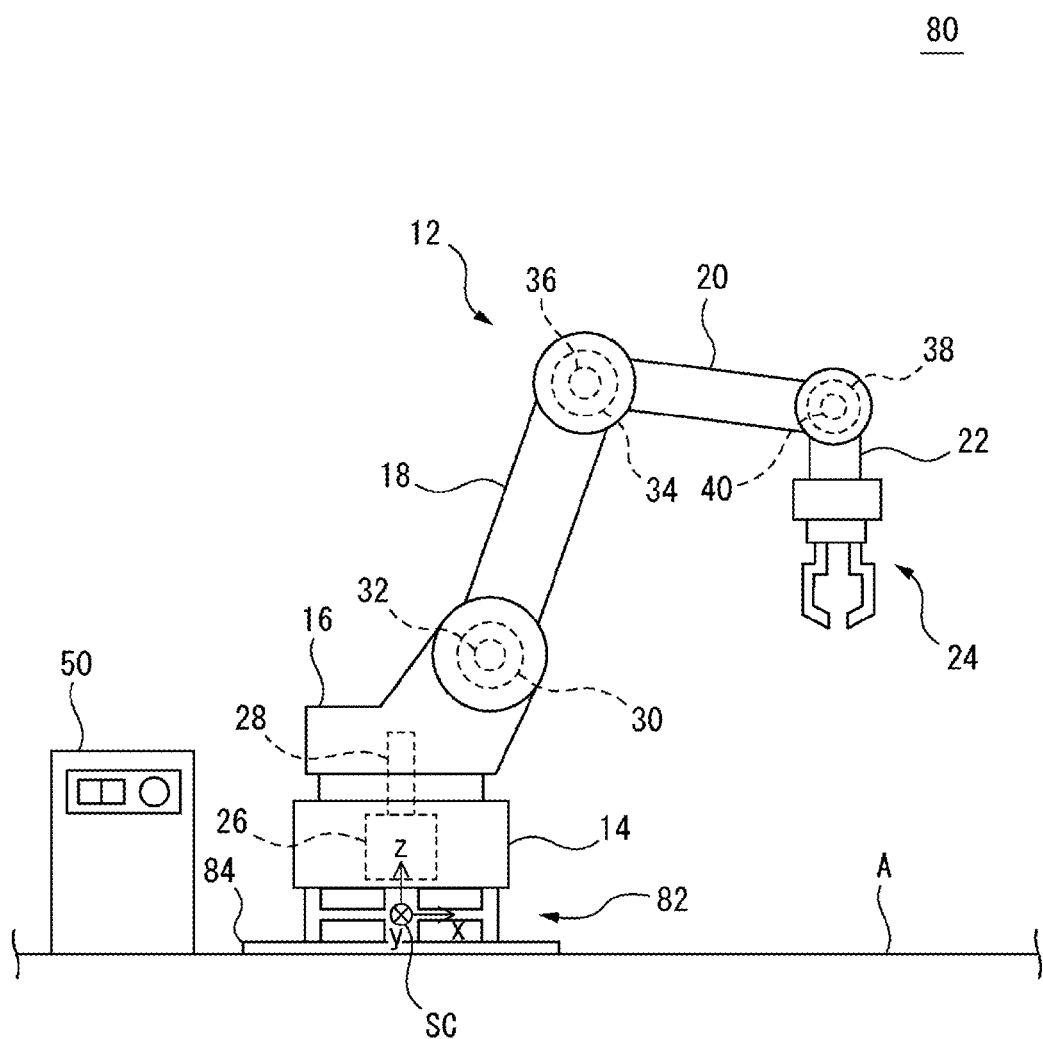
FIG. 5 is a diagram of a robot system according to another embodiment.
Figure 6:
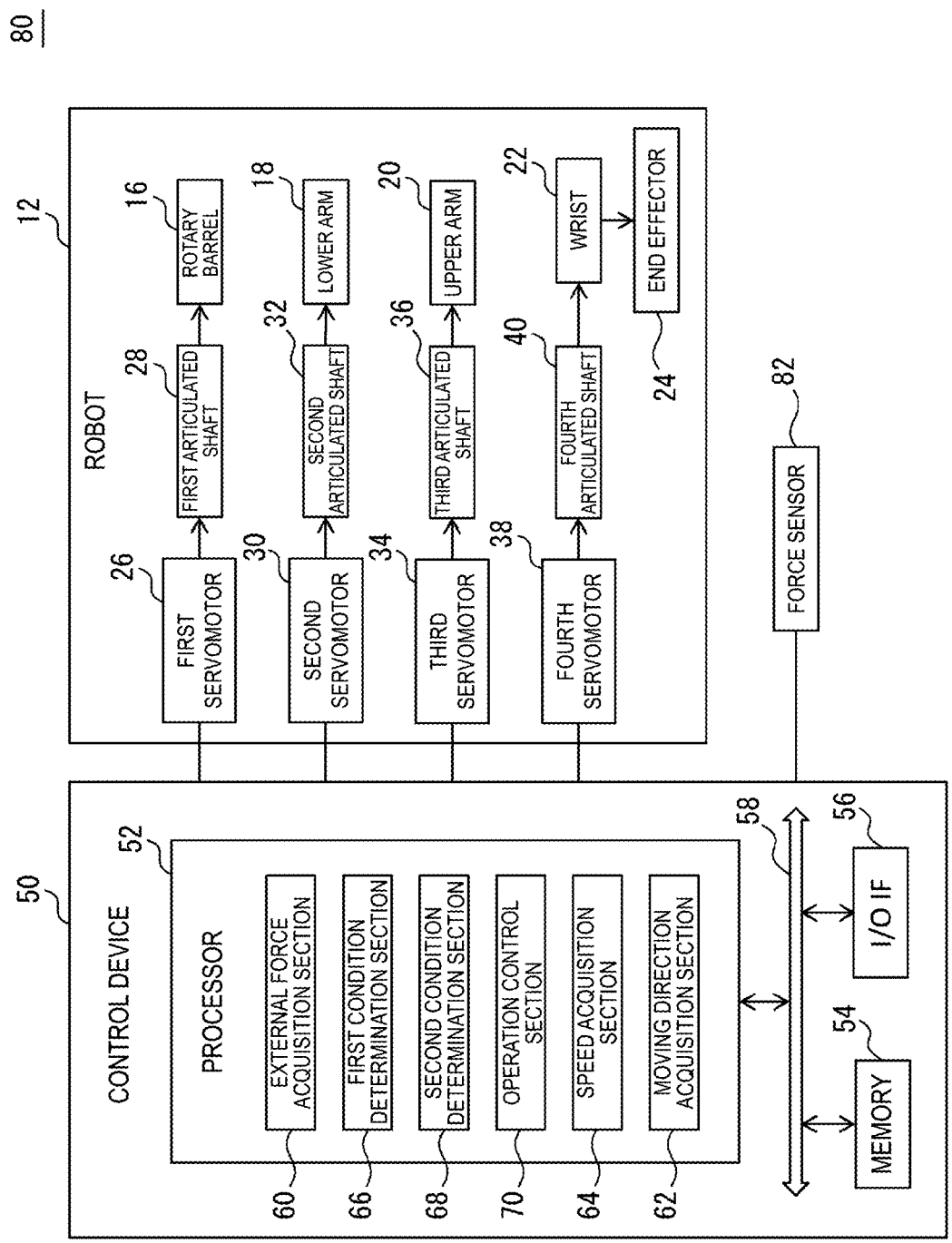
FIG. 6 is a block diagram of the robot system illustrated in FIG. 5.

Although the robot system 10 is provided with the plurality of force sensors 42, 44, 46, and 48, this should not be construed in a limiting sense, and one force sensor capable of detecting force in a plurality of directions may be provided. Such an embodiment is illustrated in FIG. 5 and FIG. 6. A robot system 80 as illustrated in FIG. 5 and FIG. 6 differs from the robot system 10 described above in the following configuration. The robot system 80 includes a force sensor 82 instead of the force sensors 42, 44, 46, and 48 described above.

For example, the force sensor 82 is a six-axis force sensor including a plurality of strain gauges (not illustrated), and is interposed between the robot base 14 and a fix plate 84 fixed on the floor A of the work cell. When force is applied to the force sensor 82, the strain gauges of the force sensor 82 transmit detection data, corresponding the force applied, to the control device 50.

The processor 52 functions as the external force acquisition section 60 and acquires the external force EF applied to the robot 12 based on the detection data received from the force sensor 82 via the I/O interface 56. Specifically, the processor 52 obtains force in six-axis directions including force in directions along the x axis, the y axis, and the z axis of a sensor coordinate system SC set to the force sensor 82 and torque around the x axis, the y axis, and the z axis, based on the detection data from the force sensor 82. Next, the processor 52 subtracts components of the internal force applied to the force sensor 82 based on the mass of the robot 12 and the inertial force produced as a result of the operation of the robot 12 respectively from the force in the six-axis directions of the sensor coordinate system SC, to obtain the external force components in the six-axis directions.

The external force components applied in the six-axis directions of the sensor coordinate system SC when the external force EF of a predetermined magnitude and direction is applied to the predetermined section of the robot 12 can be known from kinetic equations, experimental methods, simulations, or the like. In other words, the section of the robot 12 to which the external force EF is applied as well as the magnitude and the direction of the external force EF can be estimated from the external force components in the six-axis directions of the sensor coordinate system SC.

Thus, based on the external force components in the six-axis directions of the sensor coordinate system SC, the processor 52 can identify which of the movable elements of the robot 12 (the rotary barrel 16, the lower arm 18, the upper arm 20, the wrist 22, or the end effector 24) has received the external force EF, and acquire the magnitude and the direction of the external force EF.

Figure 4:
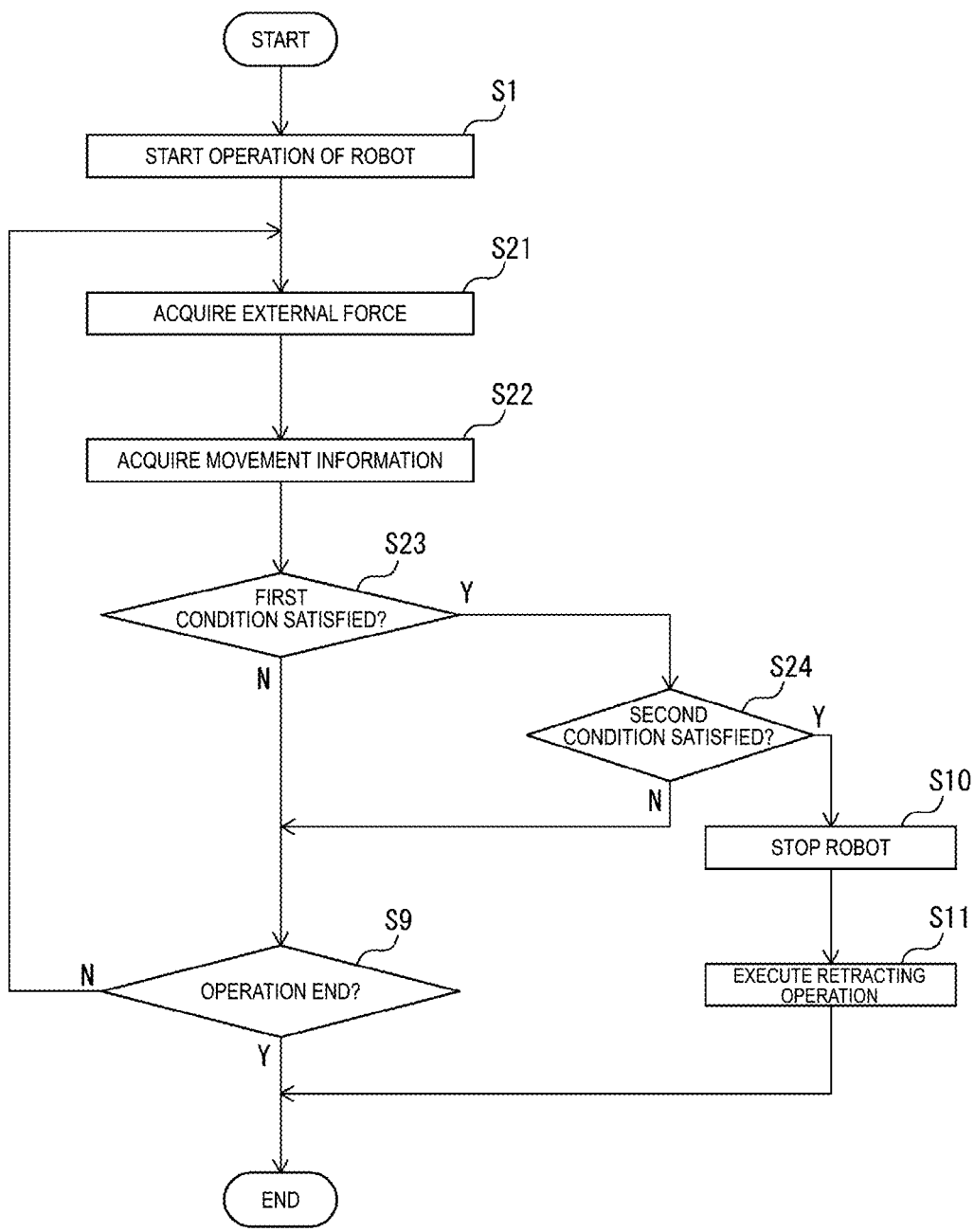
FIG. 4 is a flowchart illustrating another example of a robot control method.

In the robot system 80, the processor 52 of the control device 50 controls the robot 12 by executing the robot control flow illustrated in FIG. 4. In this case, in step S2, the processor 52 acquires the external force EF based on the detection data of the force sensor 82 as described above.

The configurations of the robot systems 10 and 80 may be combined. For example, the force sensor 82 of the robot system 80 may be applied to the robot system 10, and the processor 52 of the robot system 10 may execute the flow illustrated in FIG. 3 and the flow illustrated in FIG. 4 in parallel. In this case, the control device 50 of the robot system 10 may include a first processor 52A that executes the flow illustrated in FIG. 3 and a second processor 52B that executes the flow illustrated in FIG. 4.

Figure 7:
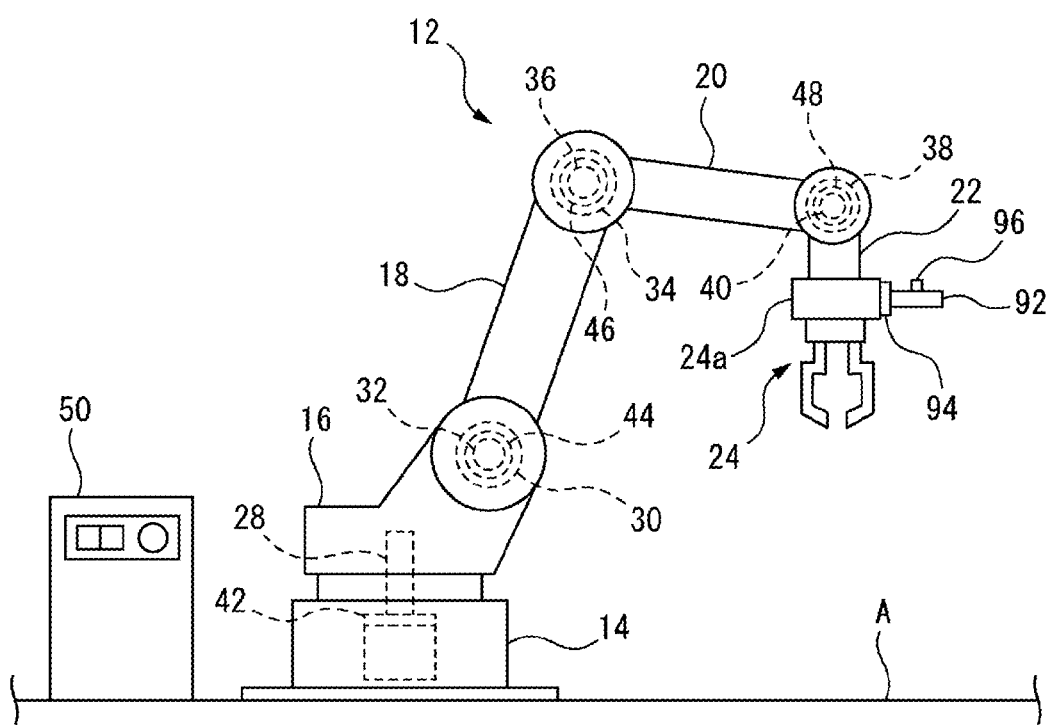
FIG. 7 is a diagram of a robot system according to still another embodiment.
Figure 8:
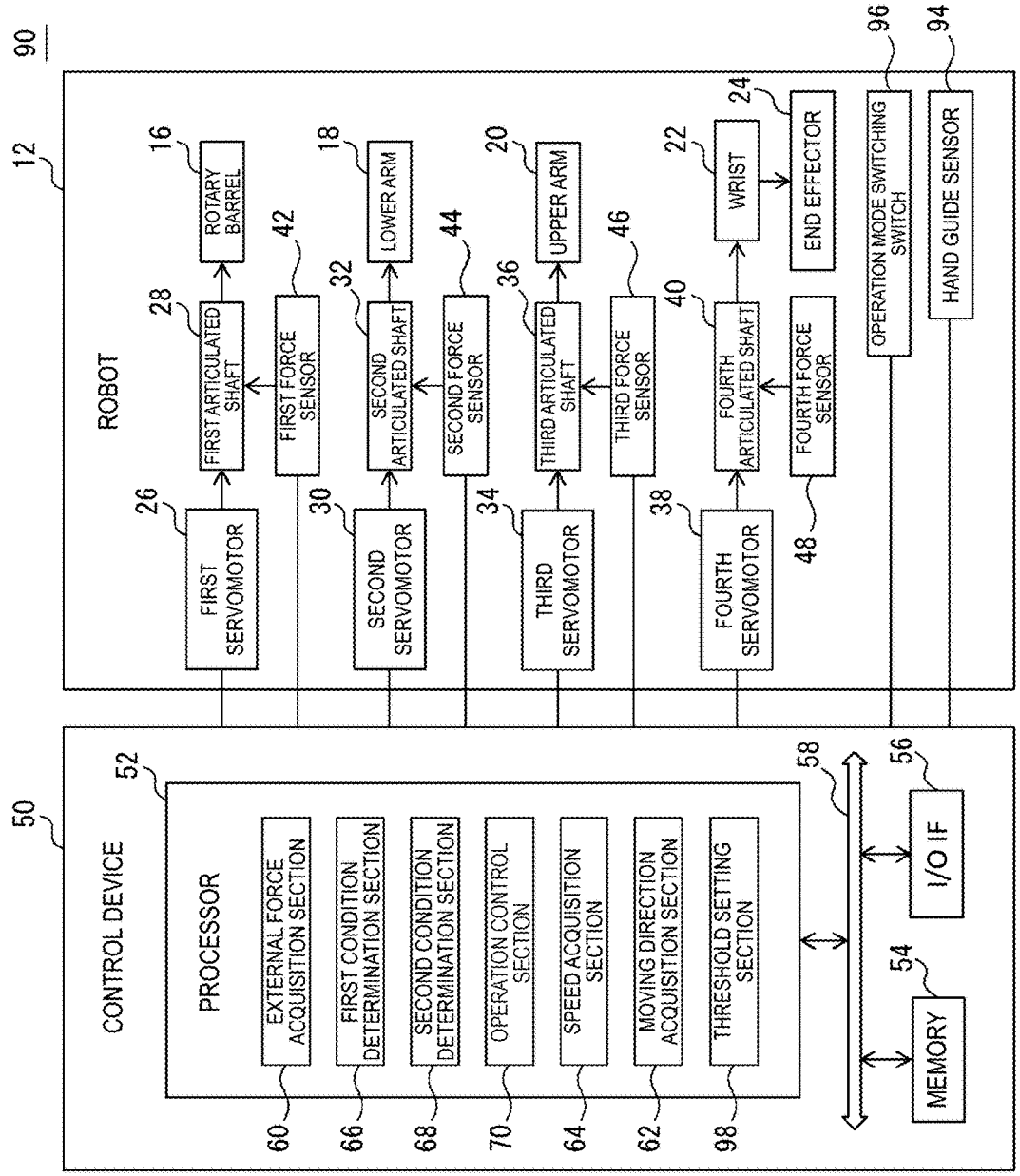
FIG. 8 is a block diagram of the robot system illustrated in FIG. 7.

Next, a robot system 90 according to still another embodiment will be described with reference to FIG. 7 and FIG. 8. The robot system 90 differs from the robot system 10 described above in the following configuration. Specifically, the robot system 90 further includes a handle 92, a hand guide sensor 94, and an operation mode switching switch 96.

The handle 92 is provided on a base 24a of the end effector 24 and has an ergonomic shape to be easily held by the worker. The hand guide sensor 94 is, for example, a six-axis force sensor interposed between the handle 92 and the base 24a. The hand guide sensor 94 detects operating force HF applied to the handle 92 by the worker and transmits the resultant detection data to the control device 50.

The operation mode switching switch 96 includes a physical switching switch, a push button, a touch sensor, and the like, and is provided on the handle 92. The operation mode switching switch 96 is used for switching the operation mode of the robot 12 between an automatic operation mode and a hand guide operation mode. The automatic operation mode is an operation mode under which the robot 12 operates automatically based on the work program WP to perform a predetermined work, as in step S1 described above.

On the other hand, the hand guide operation mode is an operation mode under which the robot 12 is manually operated based on the operating force HF applied to the handle 92 by the worker as described below. Upon being turned ON, the operation mode switching switch 96 transmits a hand guide signal "ON" (or "1") to the control device 50.

Figure 9:
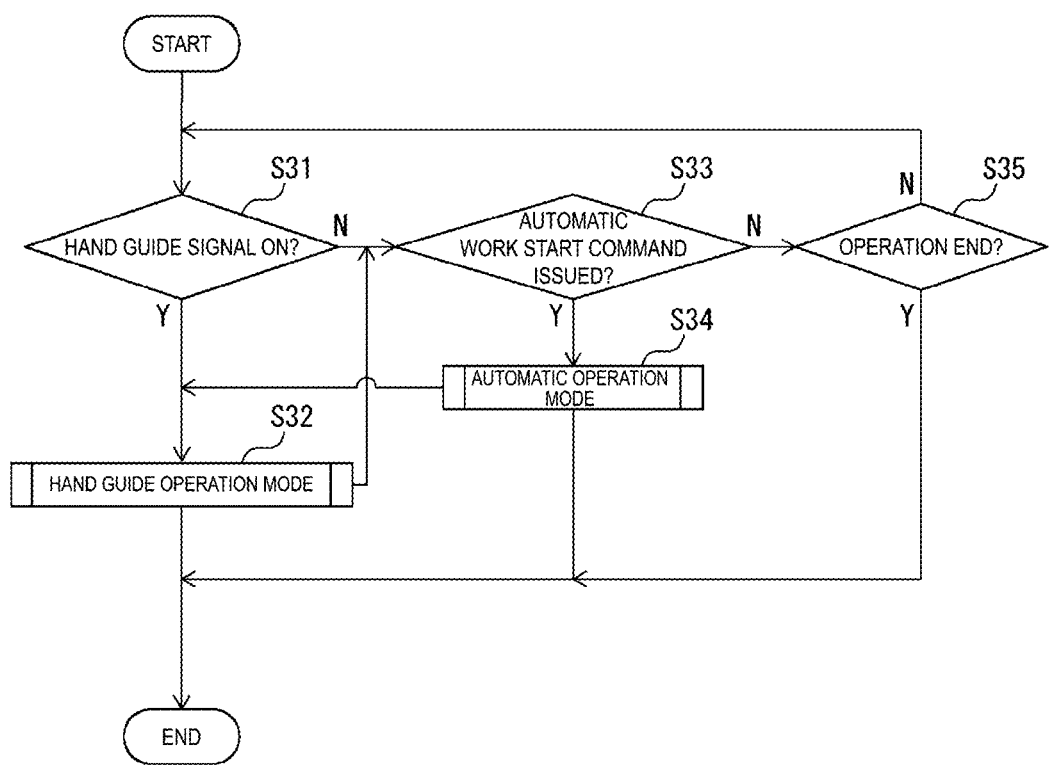
FIG. 9 is a flowchart illustrating still another example of a robot control method.

Next, a flow of robot control executed by the control device 50 of the robot system 90 will be described with reference to FIG. 9. The flow illustrated in FIG. 9 starts when the control device 50 of the robot system 90 is activated, for example. In step S31, the processor 52 determines whether or not the hand guide signal is "ON".

Specifically, when the worker turns ON the operation mode switching switch 96, the operation mode switching switch 96 transmits the hand guide signal "ON" (or "1") to the control device 50. The processor 52 determines YES and proceeds to step S32 when the hand guide signal "ON" is received. On the other hand, the processor 52 determines NO and proceeds to step S33 when the hand guide signal is "OFF" (or "0"). In step S32, the processor 52 makes the operation mode of the robot 12 transition to the hand guide operation mode, and executes the control flow under the hand guide operation mode. This step S32 will be described below.

In step S33, the processor 52 determines whether or not the automatic work start command is received from an operator, a host controller, or a computer program (e.g., the work program WP described above). The processor 52 determines YES and proceeds to step S34 when the automatic work start command is received, and determines NO and proceeds to step S35 when the automatic work start command is not received. In step S34, the processor 52 makes the operation mode of the robot 12 transition to the automatic operation mode, and executes the control flow under the automatic operation mode. This step S34 will be described below.

In step S35, the processor 52 determines whether or not a shutdown command to end the operation of the control device 50 is received. The processor 52 determines YES and ends the operation of the control device 50 when the shutdown command is received, and thus ends the flow in FIG. 9. On the other hand, the processor 52 determines NO and returns to step S31, when the shutdown command is not received.

Figure 10:
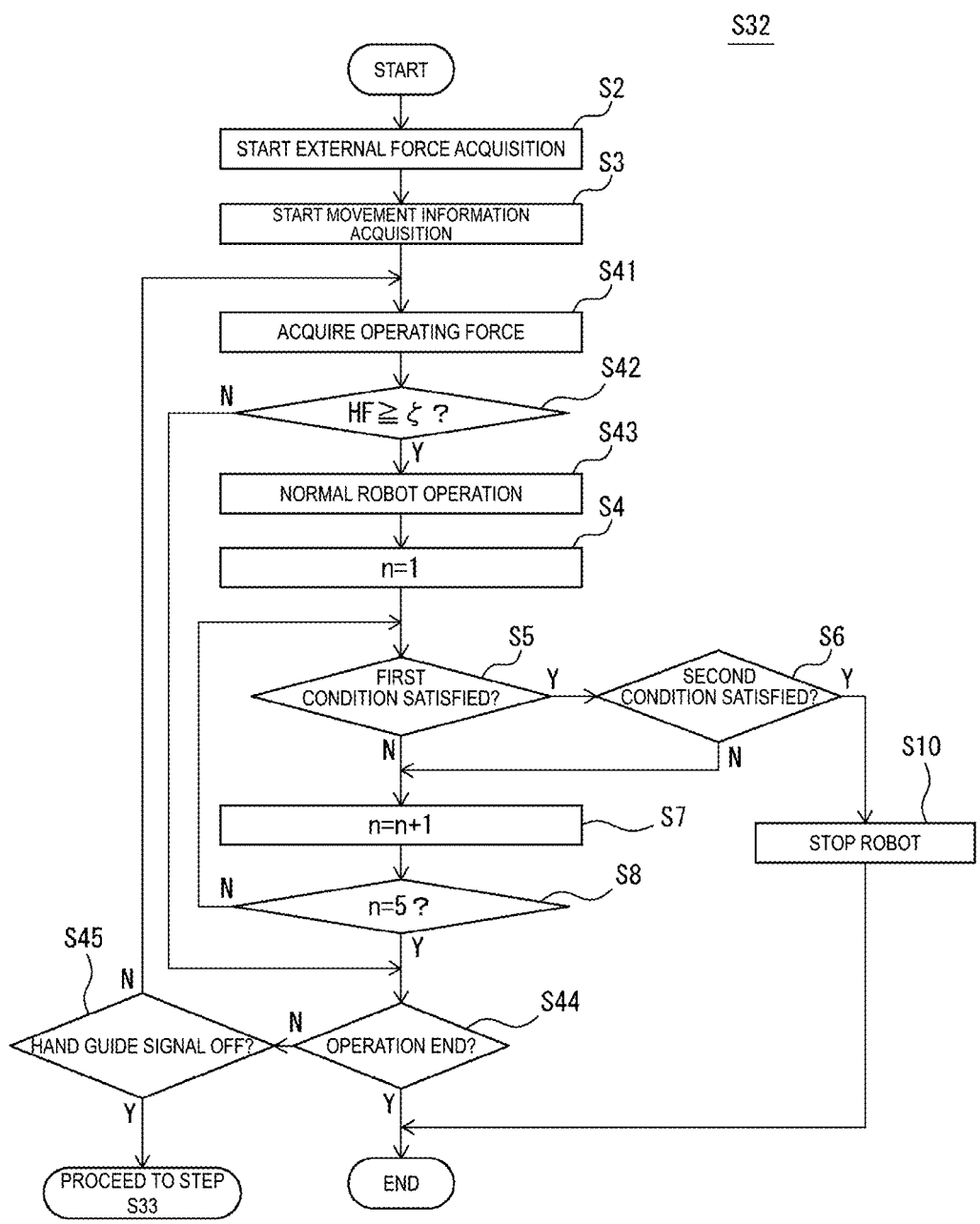
FIG. 10 is a flowchart illustrating an example of step S32 in FIG. 9.

The control flow under the hand guide operation mode in step S32 will be described with reference to FIG. 10. Note that in a flow illustrated in FIG. 10, processes similar to those of the flow illustrated in FIG. 3 are denoted by the same step number and redundant descriptions are omitted. After the start of step S32, the processor 52 executes step S2 and step S3 described above.

In step S41, the processor 52 acquires the operating force HF. Specifically, the processor 52 acquires the detection data on the operating force HF from the hand guide sensor 94. Then, the processor 52 acquires the magnitude and direction of the operating force HF applied to the handle 92 based on the detection data on the hand guide sensor 94 and data on the position and the orientation of the end effector 24.

In step S42, the processor 52 determines whether or not the magnitude of the operating force HF most recently acquired in step S41 exceeds a predetermined threshold $\zeta$ (HF≥$\zeta$). The processor 52 proceeds to step S43 upon determining that the magnitude of the operating force HF exceeds the threshold $\zeta$ (i.e., YES), and proceeds to step S44 upon determining that the magnitude of the operating force HF does not exceed the threshold $\zeta$ (i.e., NO).

In step S43, the processor 52 operates the robot 12 to move the end effector 24 in accordance with the operating force HF. Specifically, the processor 52 transmits a command to each of the servomotors 26, 30, 34, and 38, to move the end effector 24 by a predetermined distance d (e.g., 10 cm) in the direction of the operating force HF.

Note that the processor 52 may change the distance d of the movement in step S43 depending on the magnitude of the operating force HF acquired in the most recent step S41 (e.g., the larger the operating force HF, the longer the distance d). After step S43, the processor 52 sequentially executes step S4 to step S8 and step S10 as in the flow in FIG. 3. Here, the processor 52 sets the value of the threshold $\alpha_n$, referred to when executing step S5 in FIG. 10, to $\alpha_{n\_1}$.

Upon determining YES in step S8, the processor 52 determines whether or not the shutdown command is received in step S44, as in step S35 described above. Upon determining YES, the processor 52 ends the operation of the control device 50, and thus ends the flow illustrated in FIG. 9. On the other hand, upon determining NO, the processor 52 proceeds to step S45.

In step S45, the processor 52 determines whether or not the hand guide signal is "OFF" (or "0"). Specifically, when the worker turns OFF the operation mode switching switch 96, the operation mode switching switch 96 transmits the hand guide signal "OFF" (or "0") to the control device 50. The processor 52 determines YES and proceeds to step S33 in FIG. 9, when the hand guide signal is "OFF". On the other hand, the processor 52 determines NO and returns to step S41 in FIG. 10 when the hand guide signal is "ON".

Thus, the processor 52 monitors whether or not the first condition and the second condition is satisfied for each of the articulated shafts 28, 32, 36, and 40 during the execution of the hand guide operation in which the robot 12 is operated in accordance with the operating force HF, and stops or continues the operation of the robot 12 based on the monitoring. In the flow illustrated in FIG. 10, the processor 52 ends the flow illustrated in FIG. 10 after step S10, instead of executing step S11 described above.

Next, the control flow under the automatic operation mode in step S34 will be described with reference to FIG. 11. Note that in a flow illustrated in FIG. 11, processes similar to those of the flow illustrated in FIG. 3 and FIG. 9 are denoted by the same step number and redundant descriptions are omitted. After the start of step S34, the processor 52 sequentially executes step S1 to step S11 described above as in the flow in FIG. 3.

Figure 11:
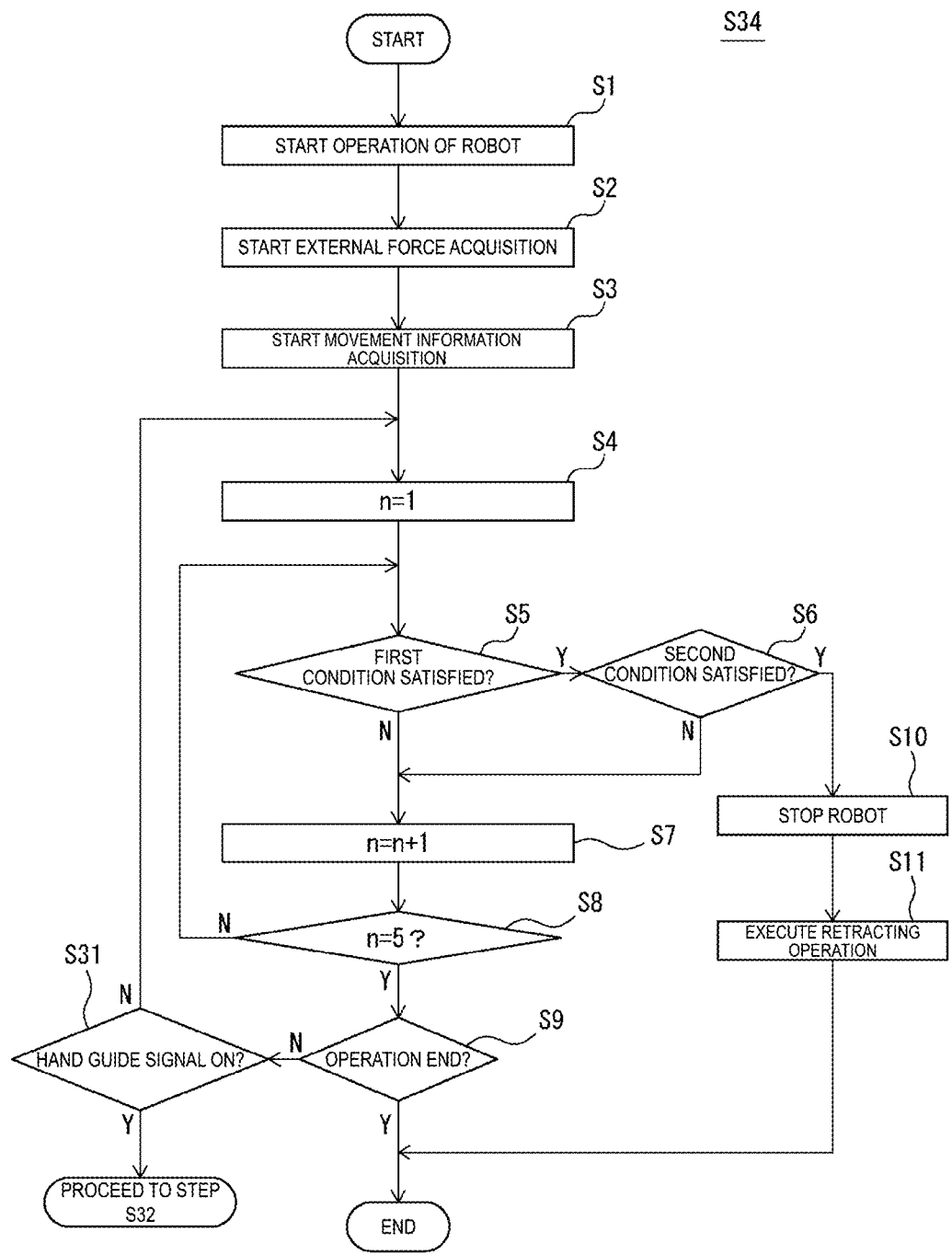
FIG. 11 is a flowchart illustrating an example of step S34 in FIG. 9.

Here, the processor 52 sets the value of the threshold $\alpha_n$, referred to when executing step S5 in FIGS. 11, to $\alpha_{n\_2}$ ($<\alpha_{n\_1}$). The processor 52 executes step S31 described above upon determining NO in step S9, and then proceeds to step S32 in FIG. 9 upon determining YES, and returns to step S4 in FIG. 11 upon determining NO.

As described above, in the present embodiment, the processor 52 sets the threshold $\alpha_n$ used for the determination on the first condition in step S5 to the value $\alpha_{n\_1}$ when the hand guide operation mode is executed in step S32, and sets the threshold $\alpha_n$ used for the determination on the first condition in step S5 to the value $\alpha_{n\_2}$ ($<\alpha_{n\_1}$) when the automatic operation mode is executed in step S34. Thus, the processor 52 functions as a threshold setting section 98 (FIG. 8) that changes the threshold $\alpha_n$ in accordance with the operation mode of the robot 12.

Under the hand guide operation mode, the robot 12 is operated based on the force intentionally applied to the handle 92 by the worker as described above. With the threshold $\alpha_{n\_1}$ used for such a hand guide operation mode set to be larger than the threshold $\alpha_{n\_2}$ used for the automatic operation mode, the robot 12 can be prevented from stopping due to the force intentionally applied by the worker.

In the robot system 90, the force sensor 82 may be applied instead of the force sensors 42, 44, 46, and 48. It should be understood that step S21 to step S24 in FIG. 4 can be applied to the flows illustrated in FIG. 10 and FIG. 11. The force sensors 42, 44, 46, and 48 described above may be disposed to detect the torque applied to the output shafts of the servomotors 26, 30, 34, and 38.

The force sensor 82 described above may be provided at any section (e.g., the lower arm 18) of the robot 12. In the embodiment described above, a case is described where the four articulated shafts 28, 32, 36, and 40, the four servomotors 26, 30, 34, and 38, and the four force sensors 42, 44, 46, and 48 are provided. However, this should not be construed in a limiting sense, the number of articulated shafts, servomotors, and force sensors may be any positive number other than four.

Further, the robot 12 is not limited to being the vertical articulated robot, and may be any other type of robot including a movable element, such as a horizontal articulated robot, a parallel link robot, or the like for example. Although the present disclosure is described above through the embodiments, the above-described embodiments do not limit the invention according to the claims.

REFERENCE SIGNS LIST 10, 80, 90 Robot system
12 Robot
50 Control device
52 Processor
60 External force acquisition section
62 Moving direction acquisition section
64 Speed acquisition section
66 First condition determination section
68 Second condition determination section
70 Operation control section

The invention claimed is:

1. A control device for a robot including a plurality of movable elements, the control device comprising:
an external force acquisition section configured to acquire external force applied to each of the plurality of movable elements during operation of the robot;
a first condition determination section configured to determine whether or not a first condition that the external force exceeding a predetermined first threshold is applied to a first movable element of the plurality of movable elements is satisfied;
a second condition determination section configured to determine whether or not a second condition that the first movable element is moving is satisfied; and
an operation control section configured to
in response to that both of the first condition and the second condition are satisfied, stop the operation of the robot by stopping a movement of the first movable element, and
in response to that at least one of the first condition or the second condition is not satisfied, continue the operation of the robot by continuing a movement of a second movable element of the plurality of movable elements, the second movable element different from the first movable element.

2. The control device of claim 1, further comprising:
a speed acquisition section configured to acquire a moving speed of the first movable element, wherein
the second condition determination section is configured to, in response to that the moving speed exceeds a predetermined second threshold, determine that the second condition is satisfied.

3. The control device of claim 1, further comprising:
a moving direction acquisition section configured to acquire a moving direction of the first movable element, wherein the first condition determination section is configured to, in response to that the external force in a direction opposite to the moving direction exceeds the first threshold, determine determines that the first condition is satisfied.

4. The control device of claim 1, further comprising:
a threshold setting section configured to change the first threshold in accordance with an operation mode of the robot.

5. The control device of claim 1, wherein
the operation control section is configured to cause the robot to execute a retracting operation, after stopping the operation of the robot.

6. The control device of claim 1, wherein
each of the plurality of movable elements is an articulated shaft of the robot, and
the external force acquisition section is configured to acquire, as the external force, external torque applied to the articulated shaft.

7. A robot system, comprising:
a robot including a plurality of movable elements; and
a control device configured to control the robot, wherein the control device comprises:
  an external force acquisition section configured to acquire external force applied to each of the plurality of movable elements during operation of the robot,
  a first condition determination section configured to determine whether or not a first condition that the external force exceeding a predetermined first threshold is applied to a first movable element of the plurality of movable elements is satisfied,
  a second condition determination section configured to determine whether or not a second condition that the first movable element is moving is satisfied, and
  an operation control section configured to
    in response to that both of the first condition and the second condition are satisfied, stop the operation of the robot by stopping a movement of the first movable element, and
    in response to that at least one of the first condition or the second condition is not satisfied, continue the operation of the robot by continuing a movement of a second movable element of the plurality of movable elements, the second movable element different from the first movable element.

8. The robot system of claim 7, further comprising:
for each movable element of the plurality of movable elements, a force sensor configured to detect force applied to the each movable element, wherein
the external force acquisition section is configured to acquire the external force based on detection data of the force sensor.

9. A control method for a robot including a plurality of movable elements, the method comprising:
  acquiring external force applied to each of the plurality of movable elements during operation of the robot;
  determining whether or not a first condition that the external force exceeding a predetermined first threshold is applied to a first movable element of the plurality of movable elements is satisfied;
  determining whether or not a second condition that the first movable element is moving is satisfied;
  in response to that both of the first condition and the second condition are satisfied, stopping the operation of the robot by stopping a movement of the first movable element; and
  in response to that at least one of the first condition or the second condition is not satisfied, continuing the operation of the robot by continuing a movement of a second movable element of the plurality of movable elements, the second movable element different from the first movable element.

* * * * *